(12) United States Patent
Burkett et al.

(10) Patent No.: US 6,476,828 B1
(45) Date of Patent: Nov. 5, 2002

(54) SYSTEMS, METHODS AND COMPUTER PROGRAM PRODUCTS FOR BUILDING AND DISPLAYING DYNAMIC GRAPHICAL USER INTERFACES

(75) Inventors: Charles Edward Burkett, Chapel Hill, NC (US); David John Clark, Warwick (GB); David Bruce Lection, Raleigh, NC (US); Roland Albert Merrick, Harvington (GB); Jay Unger, Darnestown, MD (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/321,700

(22) Filed: May 28, 1999

(51) Int. Cl.[7] ................................ G06F 3/00
(52) U.S. Cl. ............... 345/760; 345/762; 345/764; 345/841; 345/853; 707/513; 707/515
(58) Field of Search ................... 345/760, 853, 345/762, 764, 765, 835, 837, 841; 707/513, 514, 515

(56) References Cited

U.S. PATENT DOCUMENTS

| | | | |
|---|---|---|---|
| 5,121,477 A | 6/1992 | Koopmans et al. | 395/156 |
| 5,404,441 A | 4/1995 | Satoyama | 395/155 |
| 5,418,941 A | 5/1995 | Peters | 395/575 |
| 5,487,145 A | 1/1996 | Marsh et al. | 395/162 |
| 5,548,704 A | 8/1996 | Steiner et al. | 395/158 |
| 5,668,959 A | 9/1997 | Malcolm | 345/333 |
| 5,696,914 A | 12/1997 | Nahaboo et al. | 395/333 |
| 5,781,739 A | 7/1998 | Bach et al. | 395/200.57 |

(List continued on next page.)

FOREIGN PATENT DOCUMENTS

| | | |
|---|---|---|
| DE | 3844036 A | 7/1989 |
| EP | 336560 A | 10/1989 |
| EP | 541236 A | 5/1993 |
| JP | 08166865 A | 6/1996 |
| JP | 09198348 A | 7/1997 |
| JP | 10-187512 | 7/1998 |
| WO | WO9502236 A | 1/1995 |

OTHER PUBLICATIONS

Specification, Extensible Markup Language (XML) 1.0, prepared by W3C XML Working Group (WG), pp. 1–32 (Feb. 10, 1998).

Muschett, B.H. et al., "Dynamic Loading of Locale Specific Hyper Text markup Language (HTML) Pages," Research Disclosure, International Business Machines Corporation (Mar. 1998).

(List continued on next page.)

Primary Examiner—Raymond J. Bayerl
Assistant Examiner—Cuong T. Thai
(74) Attorney, Agent, or Firm—Jeanine S. Ray-Yarletts; Myers Bigel Sibley & Sajovec

(57) ABSTRACT

Systems, methods and computer program products are provided for building and displaying dynamic graphical user interfaces (GUIs) that can be updated automatically without requiring code-level modification and recompiling. In response to a request to display a particular GUI on a computer display, an Extensible Markup Language (XML) data group is selected from a plurality of XML data groups and an XML display layout is selected from a plurality of XML display layouts. The selected XML data group includes one or more aggregations of data hierarchically ordered within the selected XML data group. XML data items are hierarchically ordered within each of the aggregations of data. The selected XML display layout contains one or more areas that define respective GUI display spaces within which XML data items from the respective aggregations of data can be displayed. XML markup tags associated with each aggregation of data within the selected XML data group are matched with XML markup tags associated with a respective area contained within the selected XML display layout. The XML data items contained within each aggregation of data are rendered in hierarchical order within a respective GUI display space defined by a respective area within the XML display layout.

69 Claims, 16 Drawing Sheets

U.S. PATENT DOCUMENTS

| | | | | |
|---|---|---|---|---|
| 5,848,410 | A | | 12/1998 | Walls et al. .................... 707/4 |
| 5,877,766 | A | | 3/1999 | Bates et al. ................. 345/357 |
| 5,878,418 | A | | 3/1999 | Polcyn et al. .................. 707/10 |
| 6,003,047 | A | * | 12/1999 | Osmond et al. ............ 707/513 |
| 6,125,391 | A | * | 9/2000 | Meltzer et al. ............. 709/223 |
| 6,167,448 | A | * | 12/2000 | Hemphill et al. ........... 709/224 |
| 6,249,844 | B1 | * | 6/2001 | Schloss et al. .............. 711/122 |
| 6,272,537 | B1 | * | 8/2001 | Kekic et al. ................. 709/223 |
| 6,279,006 | B1 | * | 8/2001 | Shigemi et al. ............. 707/101 |
| 6,307,544 | B1 | * | 10/2001 | Harding ....................... 345/708 |
| 6,314,434 | B1 | * | 11/2001 | Shigemi et al. ............. 707/203 |
| 6,330,659 | B1 | * | 12/2001 | Poff et al. ..................... 712/34 |

OTHER PUBLICATIONS

Farn, B., "Method to Convert Graphical User Interface Definitions and Windows to HyperText Markup Language," IBM Technical Disclosure Bulletin, vol. 40, No. 08, pp. 167–173 (Aug. 1997).

Elder, B. et al., "Architecture for Platform and Presentation Independent User Interface for Applications," IBM Technical Disclosure Bulletin, vol. 38, No. 01, pp. 167–173 (Jan. 1995).

Jern, M., Conference Paper, "Information visualization on the Web," Abstract, 1998 IEEE Conference on Information Visualization, London UK (Jul. 1998).

Berg, D., "An Internet Solution," Abstract, Object Magazine, vol. 7, No. 3 (May 1997).

Suzuki, T. et al., "Multimedia HTML Layout Method," Abstract, IEICE Transactions on Communications, vol. E79–B, No. 8 (Aug. 1996).

Gray, M.. et al., "Coupling application design and user interface design," Abstract, CHI '92 Conference Proceedings ACM Conference on Human Factors in Computing Systems Striking a Balance (1992).

Makela, R. et al., "Keep it simple–interactive electronic applications with SGML," Abstract, SGML Europe '97 Conference Proceedings (May 1997).

Flammia, G., "SMIL makes Web applications multimodal," Abstract, IEEE Intelligent Systems, vol. 13, No. 4 (Jul.–Aug. 1998).

de Baar, DJMJ et al., "Coupling application design and user interface design," Abstract, CHI '92 Conference Proceedings, ACM Conference on Human Factors in Computing Systems, Striking a Balance (1992).

* cited by examiner

FIG. 2A

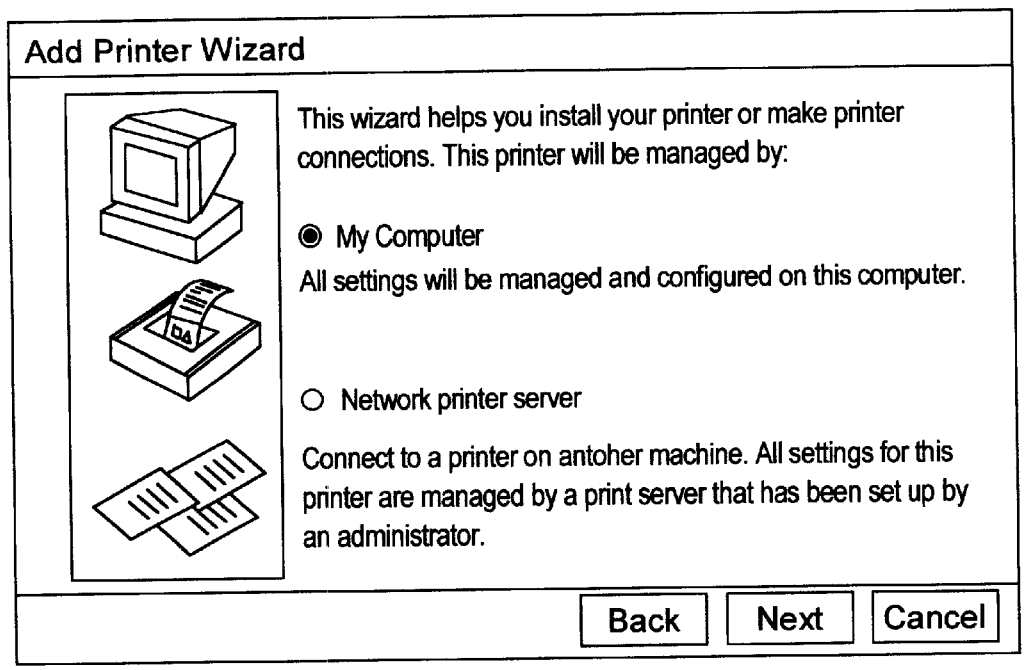

Add Printer Wizard

This wizard helps you install your printer or make printer connections. This printer will be managed by:

● My Computer
All settings will be managed and configured on this computer.

○ Network printer server
Connect to a printer on antoher machine. All settings for this printer are managed by a print server that has been set up by an administrator.

[ Back ] [ Next ] [ Cancel ]

FIG. 2B

```
<WIZARD ID="wizard-id"
  [WINDOW-STYLE="ADDITIONAL|REPLACEMENT"]
  [CAPTION-POSITION="TOP|BOTTOM|LEFT|RIGHT"]
  <PAGE ID="page-id">
    <AREA>
    </AREA>
  </PAGE>
  <PAGE>
    <AREA>
    </AREA>
  </PAGE>
</WIZARD>
```

```
<PROPERTY-SHEET ID="property-sheet-id"
  [COMPLETE-EVENT="TRUE|FALSE"]
  [CANCEL-EVENT="TRUE|FALSE"]
  [CAPTION-POSITION="TOP|BOTTOM|LEFT|RIGHT"]
  [CAPTION-ALOGH="LEFT|CENTER|RIGHT"]
  [WINDOW-STYLE="ADDITIONAL|REPLACEMENT"]>
  <PAGE ID="page-id">
    <AREA>
    </AREA>
  </PAGE>
  <PAGE>
    <AREA>
    </AREA>
  </PAGE>
</PROPERTY SHEET>
```

```
<DIALOG ID="dialog-layout-id"
  [COMPLETE-EVENT="TRUE|FALSE"]
  [CANCEL-EVENT="TRUE|FALSE"]
  [CAPTION-POSITION="TOP|BOTTOM|LEFT|RIGHT"]
  [CAPTION-ALIGN="LEFT|CENTER|RIGHT"]
  [WINDOW-STYLE="ADDITIONAL|REPLACEMENT"]>
  <AREA>
  </AREA>
</DIALOG>
```

Area 24

```
<AREA-TYPE ID="areaID"
  [CAPTION-POSITION="TOP|BOTTOM|LEFT|RIGHT"]
  [CAPTION-ALIGH="LEFT|CENTER|RIGHT"]
  [X="position-value-pixels"]
  [Y="position-value-pixels"]
  [DX="size-value-pixels"]
  [DY="size-value-pixels"]>
</AREA-TYPE>
```

FIG. 6A
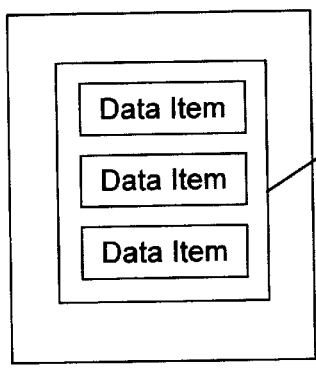
FIG. 6B
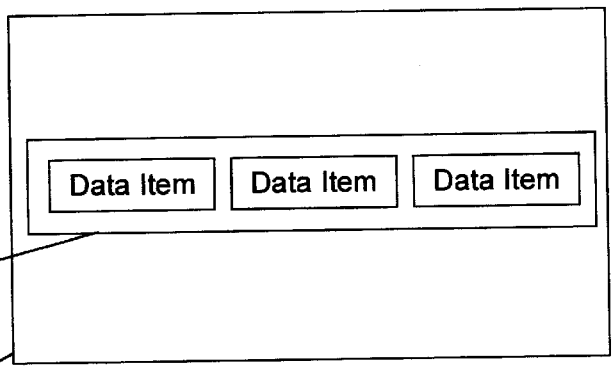
FIG. 6C
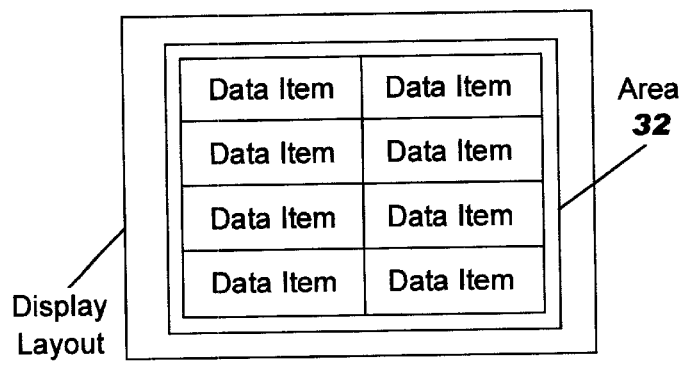
FIG. 6F
```
<DIALOG>
  <DEFINITE-AREA>
    <VERTICAL-AREA X="5", Y="2", DX="50", DY="20">
    </VERTICAL-AREA>
    <VERTICAL-AREA X="5", Y="32", DX="50", DY="20">
    </VERICAL-AREA>
</DIALOG>
```

FIG. 6D

```
Tree Area Example

Cities:
  ○ □ North Carolina
     ○ □ Mecklenburg
          □ Charlotte
          □ Matthews
     ○ □ Orange
          □ Carrboro
          □ Chapel Hill
          □ Efland
          □ Hillsborough
     ○ □ Wake
          □ Cary
          □ Fuquay Varina
          □ Raleigh
          □ Wake Forest
  ○ □ California
     ○ □ Orange
          □ Newport Beach
          □ Costa Mesa
     ○ □ San Diego
          □ La Mesa
          □ San Diego Close  Print  Edit  OK  Cancel                    Tips
Tree Area Example
```

FIG. 6E

```
<DATA-GROUP ID="TreeData" SHARED="TRUE">
    <LIST-GROUP ID="list" SELECTION-POLICY="MULTIPLE">
        <CAPTION>Cities</CAPTION>
        <GROUP ID="NC">
        <CAPTION>North Carolina<ICAPTION>
        <GROUP>
        <CAPTION>Mecklenburg</CAPTION>
        <STRING><CAPTION>Charlotte</CAPTION></STRING>
        <STRING><CAPTION>Matthews</CAPTION></STRING>
        </GROUP>
        <GROUP>
        <CAPTION>Orange</CAPTION>
        <STRING><CAPTION>Carrboro</CAPTION></STRING>
        <STRING><CAPTION>Chapel Hill</CAPTION></STRING>
        <STRING><CAPTION>Efland</CAPTION></STRING>
        <STRING><CAPTION>Hillsborough</CAPTION></STRING>
        </GROUP>
        <GROUP>
        <CAPTION>Wake</CAPTION>
        <STRING><CAPTION>Cary</CAPTION></STRING>
        <STRING><CAPTION>Fuquay-Varina<ICAPTION></STRING>
        <STRING><CAPTION>Raleigh</CAPTION></STRING>
        <STRING><CAPTION>Wake Forest</CAPTION></STRING>
        </GROUP>
        </GROUP>
        <GROUP ID="CA">
        <CAPTION>California</CAPTION>
        <GROUP>
        <CAPTION>Orange</CAPTION>
        <STRING><CAPTION>Newport Beach</CAPTION></STRING>
        <STRING><CAPTION>Costa Mesa</CAPTION><ISTRING>
        </GROUP>
        <GROUP>
        <CAPTION>San Diego</CAPTION>
        <STRING><CAPTION>La Mesa</CAPTION></STRING>
        <STRING><CAPTION>San Diego</CAPTION></STRING>
        <STRING><CAPTION>Tecate</CAPTION></STRING>
        </GROUP>
        </GROUP>
        </LIST-GROUP>
    </DATA-GROUP>

<DIALOG ID="TreeDialog" COMPLETE-EVENT="TRUE" CANCEL EVENT="TRUE">
        <TREE-AREA/>
    </DIALOG>
    </DEFINITIONS>
```

FIG. 8

```
<DATA-GROUP ID="NameAddress">

<GROUP ID="FullName">                              42a
  <VALUE>Smith</VALUE>
  </STRING>
  <STRING TYPE="STRING" ID="FirstName"/>
  </GROUP>

<GROUP ID="MailAddress">                           42b
  <STRING ID="Street"/>
  <STING ID="City"/>
  <STRING ID="Province"/>
  <STRING ID="PostalCode"/>
  </GROUP>

</DATA-GROUP>
```

```
<DATA-GROUP>
  <GROUP>
    <DATA-ITEM>
    <DATA-ITEM>
    <DATA-ITEM>
    <DATA-ITEM>
  </GROUP>
</DATA-GROUP>
```

FIG. 10

```
<DATA-GROUP ID="Wizard">
  <GROUP ID="PAGE1">
    <STRING ID="LastName"/>
    <STRING ID="FirstName"/>
    <STRING ID="MiddleName"/>
  </GROUP>
  <GROUP ID="PAGE2">
    <STRING ID="Address"/>
    <STRING ID="City"/>
    <STRING ID="State"/>
    <STRING ID="Country"/>
    <WHEN REFID="Country" CONDITION="EQ>
      <VALUE>USA</VALUE>
      <STRING ID="County" MANDATORY="TRUE"/>
    </WHEN>
    <STRING ID="ZipCode"/>
  </GROUP>
</DATA-GROUP>
```

```
<DATA-GROUP ID="GetName" xmlns='http://ui.domain/UIDML' >
  <GROUP ID="PersonName">
    <CAPTION>Person's complete name</CAPTION>
    <LIST-GROUP ID="PersonTitles" SELECTION-POLICY="SINGLE">
      <CAPTION>Title</CAPTION>
      <HINT>This is a set of valid titles for a person.</HINT>
      <STRING ID="Mr">Mr.</STRING>
      <STRING ID="MRS">Mrs.</STRING>
      <STRING ID="MISS">Miss.</STRING>
      <STRING ID="MS">Ms.</STRING>
    </LIST-GROUP>
    <STRING ID="FirstName">
      <CAPTION>First Name</CAPTION>
      <VALUE>Roland</VALUE>
    </STRING>
    <STRING ID="Initial" MAXLENGTH="1">
      <CAPTION>Initial</CAPTION>
      <VALUE>A</VALUE>
    </STRING>
    <STRING ID="LastName">
      <CAPTION>Last Name</CAPTION>
      <VALUE>Merrick</VALUE>
    </STRING>
  </GROUP>
</DATA-GROUP>
```

73

74 →

```
<DIALOG ID="dialog-layout-id"
[COMPLETE-EVENT="TRUE|FALSE"]
[CANCEL-EVENT="TRUE|FALSE"]
[CAPTION-POSITION="TOP|BOTTOM|LEFT|RIGHT"]
[CAPTION-ALIGN="LEFT|CENTER|RIGHT"]
[WINDOW-STYLE="ADDITIONAL|REPLACEMENT"]>
  <AREA>
  </AREA>
</DIALOG>
```

Person's complete name

| | |
|---|---|
| Title | Mr. |
| First Name | Roland |
| Initial | A |
| Last name | Merrick |

OK  Cancel

FIG. 14

```
<DIALOG ID="dialog-layout-id"
  [COMPLETE-EVENT="TRUE|FALSE"]
  [CANCEL-EVENT="TRUE|FALSE"]
  [CAPTION-POSITION="TOP|BOTTOM|LEFT|RIGHT"]
  [CAPTION-ALIGN="LEFT|CENTER|RIGHT"]
  [WINDOW-STYLE="ADDITIONAL|REPLACEMENT"]>
  <AREA>
    <COMPONENT ID="LastName"/>
    <COMPONENT ID="FirstName"/>
  </AREA>
</DIALOG>
```

SYSTEMS, METHODS AND COMPUTER PROGRAM PRODUCTS FOR BUILDING AND DISPLAYING DYNAMIC GRAPHICAL USER INTERFACES

FIELD OF THE INVENTION

The present invention relates generally to user interfaces and, more particularly, to graphical user interfaces.

RESERVATION OF COPYRIGHT

A portion of the disclosure of this patent document contains material to which a claim of copyright protection is made. The copyright owner has no objection to the facsimile reproduction by anyone of the patent document or the patent disclosure, as it appears in the Patent and Trademark Office patent file or records, but reserves all other rights whatsoever.

BACKGROUND OF THE INVENTION

Computer graphical user interfaces (GUIs) written in conventional programming languages, such as JAVA and C/C++, are typically static in nature. This means that once a user interface has been rendered on a display device, a fixed number of GUI controls are displayed. If data within a displayed GUI changes, such as the number and/or format of displayed GUI controls, the GUI must typically be modified at the code level, recompiled and then re-rendered on the display device. As a result, existing GUIs may not be able to react quickly to the needs and requests of users.

Accordingly, there is a need for GUIs that can change dynamically in response to user requests and other external factors. Furthermore, there is a need for GUIs that can be modified without requiring code changes and recompiling.

SUMMARY OF THE INVENTION

The present invention is directed to systems, methods and computer program products for building and displaying dynamic graphical user interfaces (GUIs) that can be updated automatically without requiring code modification and recompiling. In response to a request to display a particular GUI on a computer display, an Extensible Markup Language (XML) data group is selected from a plurality of XML data groups. The selected XML data group includes one or more aggregations (groups) of data hierarchically ordered within the selected XML data group. XML data items are hierarchically ordered within the aggregations of data.

Also, an XML display layout is selected in response to the request to display the GUI. The selected XML display layout contains one or more areas that define respective GUI display spaces within which XML data items from the respective aggregations of data can be displayed. XML markup tags associated with each aggregation of data within the selected XML data group are matched with XML markup tags associated with a respective area contained within the selected XML display layout. The XML data items contained within each aggregation of data are rendered in hierarchical order within a respective GUI display space defined by a respective area within the XML display layout. GUI controls associated with displayed XML data items may also be rendered within a respective GUI display space.

According to the present invention, each area defined by an XML display layout may contain display order information for XML data items contained within a respective aggregation of data. Furthermore, the step of rendering XML data items may include rendering the XML data items within a respective GUI display space according to the display order information. Each area defined by an XML display layout may also contain display format information that defines the format within which XML data items from an aggregation of data are displayed. Furthermore, the step of rendering XML data items may include rendering the XML data items within a respective GUI display space according to the display format information.

The dynamic nature of GUIs according to the present invention may facilitate enhanced user interactions with computer systems.

BRIEF DESCRIPTION OF THE DRAWINGS

FIG. 2A is a display layout having a wizard format.

FIG. 2B illustrates exemplary XML markup tags for specifying the wizard display layout of FIG. 2A.

FIG. 6A is a display layout containing a vertical area and within which data items are displayed vertically.

FIG. 6B is a display layout containing a horizontal area and within which data items are displayed horizontally.

FIG. 6C is a display layout containing a table area and within which data items are displayed within a two-dimensional array of rows and columns.

FIG. 6D is a display layout containing a tree area and within which data items are displayed in "tree" format.

FIG. 6E illustrates exemplary XML markup tags for specifying the tree area of FIG. 6D.

FIG. 6F illustrates exemplary XML markup tags for specifying a display layout containing a definite area and within which data items are displayed at specified coordinates within the display layout.

FIG. 8 illustrates exemplary XML markup tags for defining a data group having multiple hierarchically ordered groups.

FIG. 9 illustrates the use of <DATA-TYPE></DATA-TYPE> markup tags to declare data items.

FIG. 10 illustrates the use of <WHEN></WHEN> tags markup tags to alter the presentation of data from a data group according to an embodiment of the present invention.

FIG. 13A illustrates matching a data group and display layout to build a GUI according to the present invention.

FIG. 13B illustrates a GUI built and displayed according to the matched data group and display layout of FIG. 13A.

FIG. 14 illustrates the insertion of the XML markup tags <COMPONENT ID="LastName"/> and <COMPONENT ID="FirstName"/> between the <AREA></AREA> markup tags of the display layout of FIG. 13A to cause the data entry fields and respective captions for "FirstName" and "Last-Name" to be reversed when displayed within the dynamic GUI of FIG. 13B.

DETAILED DESCRIPTION OF THE INVENTION

Figure 1:
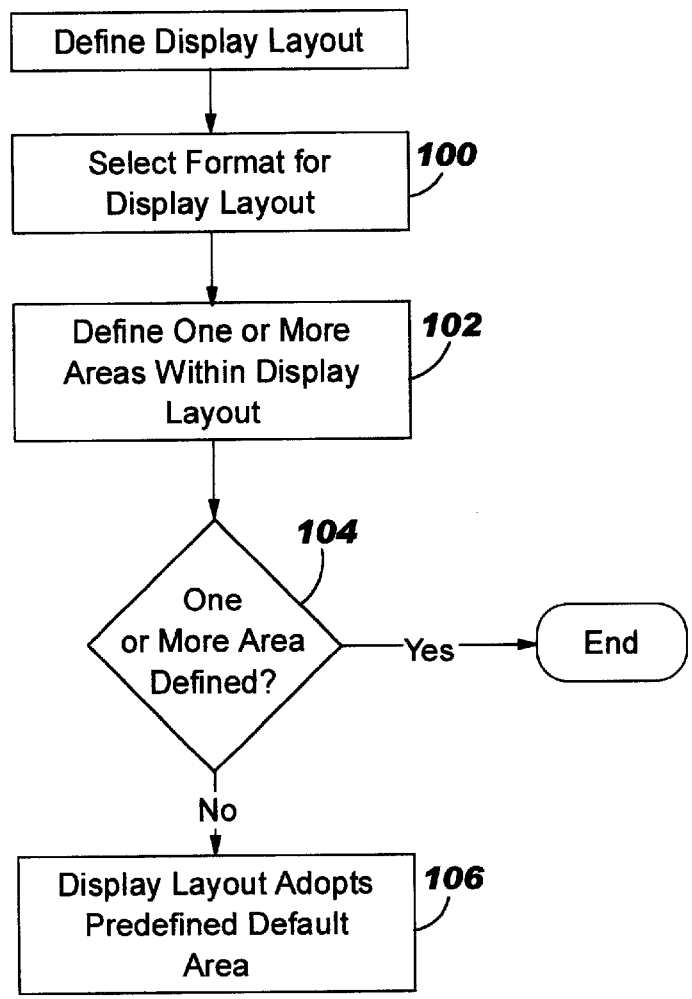
FIG. 1 schematically illustrates operations according to the present invention for defining a display layout for a GUI that contains one or more areas within which data items are displayed.

The present invention now is described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

HyperText Markup Language (HTML)

HTML utilizes various tags that control format attributes and that identify different portions of a document (i.e., <tag name>text</tag name>). Tags are conventionally denoted by the "<>" symbols, with the actual tag between the brackets. Most markup language tags have an opening tag "<tag>" and a closing tag "</tag>." A tag is a singular entity that opens or closes an element. For instance, the <P> HTML tag opens a paragraph element. Likewise, the </P> HTML tag closes a paragraph element. These two tags, plus the content between them, represent the HTML element. A tag is only part of an element, not the element itself. The HTML language is described in the HTML Reference Manual, Jan. 2, 1996, published by Sandia National Laboratories, which is incorporated herein by reference, in its entirety.

Extensible Markup Language (XML)

Extensible Markup Language (XML) is currently a formal recommendation from the World Wide Web Consortium as a way to make the Web a more versatile tool. XML syntax guidelines and the definition of XML entities are presented in the Extensible Markup Language (XML) 1.0 Specification, Feb. 10, 1998, which is incorporated herein by reference in its entirety.

XML is similar to HTML in that both languages are subsets of Standard Generalized Markup Language (SGML) and that both utilize tags to describe the contents of a page or file. HTML, however, describes the content of a Web page (mainly text and graphic images) only in terms of how content is to be displayed and interacted with. XML describes the content in terms of what data is being described. For example, a <PHONENUM> tag could indicate that the data following the tag is a phone number. This means that an XML file can be processed purely as data by a program or it can be stored with similar data on another computer or, like an HTML file, that it can be displayed. For example, depending on how the application program in the receiving computer wanted to handle the phone number, it could be stored, displayed, or dialed. XML is "extensible" because, unlike HTML, XML markup tags can be unlimited and can be self-defining.

The structure of an XML document is essentially a tree. The root element is the top-level element, and its descendants (i.e., the other elements) branch out from there. XML parsers are applications that examine XML code and report forming errors. An XML parser reads XML files, generates a hierarchically structured tree, herein referred to as a Document Object Model Tree ("DOM Tree"), and then hands off data to viewers and other applications for processing.

Document Type Definitions (DTDs) may accompany an XML document, essentially defining the rules of the XML document, such as which elements are present and the structural relationship between the elements. DTDs can help validate data when a receiving application does not have a built-in description of the incoming XML data. With XML, however, DTDs are optional.

As will be appreciated by one of skill in the art, the present invention may be embodied as a method, data processing system, or computer program product. Accordingly, the present invention may take the form of an entirely hardware embodiment, an entirely software embodiment or an embodiment combining software and hardware aspects. Furthermore, the present invention may take the form of a computer program product on a computer-usable storage medium having computer-usable program code means embodied in the medium. Any suitable computer readable medium may be utilized including hard disks, CD-ROMs, optical storage devices, or magnetic storage devices.

Computer program code for carrying out operations of the present invention is preferably written in an object oriented programming language such as JAVA®, Smalltalk or C++. However, the computer program code for carrying out operations of the present invention may also be written in conventional procedural programming languages, such as the "C" programming language, or functional (or fourth generation) programming languages such as Lisp, SML, or Forth may also be utilized. The program code for carrying out operations of the present invention may execute entirely on one or more data processors.

JAVA® is an object-oriented programming language developed by Sun Microsystems, Mountain View, California. JAVA® is a portable and architecturally neutral language. JAVA® source code is compiled into a machine-independent format that can be run on any machine with a JAVA® runtime system known as the JAVA® Virtual Machine (JVM). The JVM is defined as an imaginary machine that is implemented by emulating a processor through the use of software on a real machine. Accordingly machines running under diverse operating systems, including UNIX®, Windows 95®, Windows NT®, and MacIntosh® having a JVM can execute the same JAVA® program.

The present invention is described below with reference to flowchart illustrations of methods, apparatus (systems)

and computer program products according to an embodiment of the invention. It will be understood that each block of the flowchart illustrations, and combinations of blocks in the flowchart illustrations, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Display Layouts

Referring now to FIG. 1, operations according to the present invention are illustrated for defining an XML display layout for a GUI that contains one or more areas within which data items are displayed. A user initially selects a format for a display layout (Block 100). Exemplary display layout formats may include, but are not limited to, "wizard", "property sheet" and "dialog" formats. As would be understood by one of skill in the art, a wizard display layout format is typically used with a utility program known as a "wizard" that is configured to ask a user various questions and then utilize the user's responses to perform one or more functions.

Wizards are typically used in conjunction with an application to help a user perform a particular task within the application. For example, a "letter wizard" within a word processing application may be configured to lead a user through the various steps of producing different types of letters.

Figures 3A, 3B:
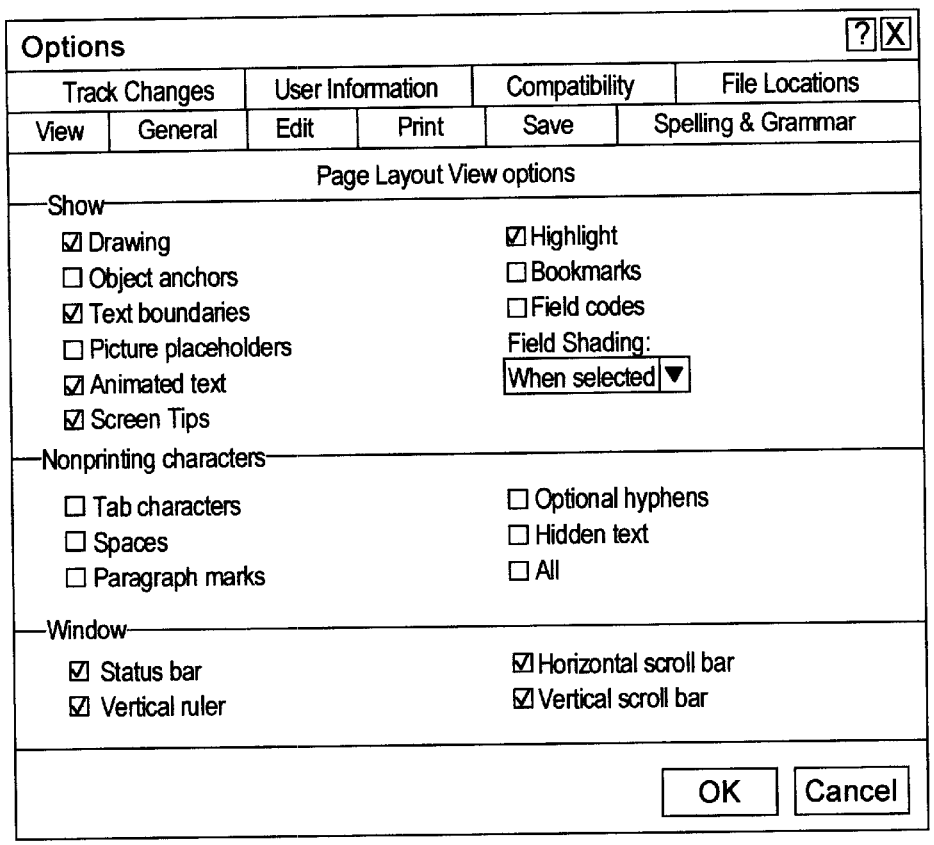
FIG. 3A is a display layout having a property sheet format.
FIG. 3B illustrates exemplary XML markup tags for specifying the property sheet display layout of FIG. 3A.
Figures 4A, 4B:
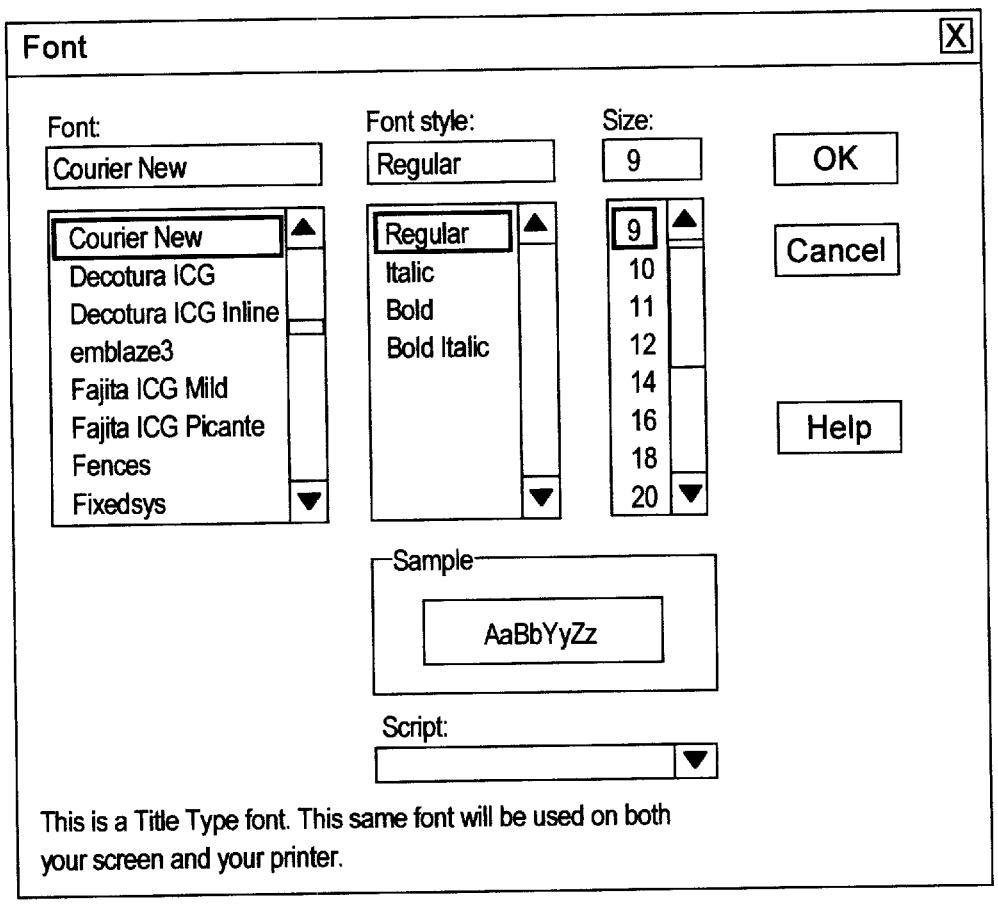
FIG. 4A is a display layout having a dialog format.
FIG. 4B illustrates exemplary XML markup tags for specifying the dialog display layout of FIG. 4A.

An exemplary display layout 10 in wizard format is illustrated in FIG. 2A and may be specified according to the present invention using the XML markup tags 12 illustrated in FIG. 2B. A display layout in property sheet format utilizes a "tabbed notebook" appearance wherein a different page of user-interactive fields is presented to a user when a respective tab is activated. An exemplary display layout 14 in property sheet format is illustrated in FIG. 3A and may be specified according to the present invention using the XML markup tags 16 illustrated in FIG. 3B. A display layout in dialog format is a single page of user-interactive fields. An exemplary display layout 18 in dialog format is illustrated in FIG. 4A and may be specified according to the present invention using the XML markup tags 20 illustrated in FIG. 4B.

Figures 5A, 5B:
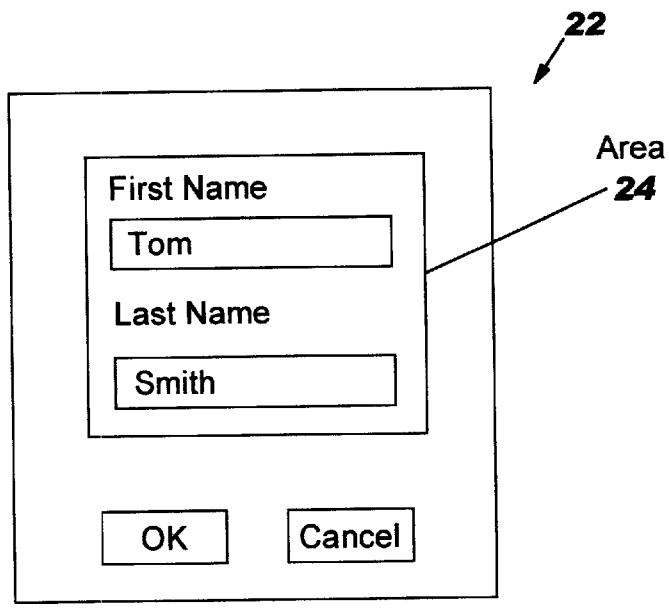
FIG. 5A is a display layout containing an exemplary area within which data items are displayed.
FIG. 5B illustrates exemplary XML markup tags for specifying the area of FIG. 5B.

Referring back to FIG. 1, once a display layout format has been selected, one or more areas within the display layout are defined (Block 102). If no areas are defined (Block 104), the display layout adopts a predefined default area (Block 106). Each defined area and each default area represents a respective display "space" within which data items are displayed, as will be described below. An exemplary display layout 22 in dialog format and containing an area 24 is illustrated in FIG. 5A. The illustrated display layout 22 may be specified using the XML markup tags 26 illustrated in FIG. 5B.

According to the present invention, areas within display layouts may have various shapes and configurations. For example, areas may have "vertical" configurations, "horizontal" configurations, "table" configurations, "tree" configurations and "definite" configurations. A "vertical" area 28 displays data items and their captions within a display layout vertically, as illustrated in FIG. 6A. A "horizontal" area 30 displays data items and their captions within a display layout horizontally, as illustrated in FIG. 6B. A "table" area 32 displays data items within a two-dimensional array of rows and columns, as illustrated in FIG. 6C. Each row of the table may be addressable and selectable by a user.

A "tree" area displays data items within a graphical tree, as illustrated in FIG. 6D. FIG. 6E illustrates exemplary XML markup tags for specifying the tree area of FIG. 6D. Each node within the illustrated tree area of FIG. 6D may be addressable and selectable by a user.

A "definite" area displays data items at specific "X-Y" coordinates within a display layout. Positioning of a data item within a display layout may be in absolute pixel units. An exemplary definite area configuration can be specified using the XML markup tags 36 illustrated in FIG. 6E.

Data Groups

Figure 7:
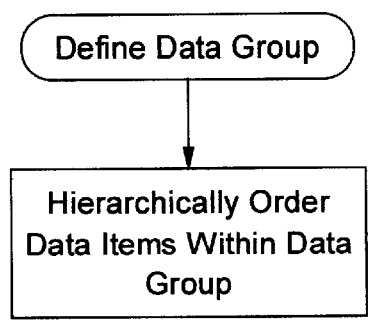
FIG. 7 schematically illustrates defining a data group by hierarchically ordering one or more data items therewithin.

An XML data group is defined according to the present invention by hierarchically ordering one or more XML data items therewithin (FIG. 7, Block 110). FIG. 8 illustrates an exemplary data group 40 defined by multiple hierarchically ordered aggregations of data (hereinafter "groups") 42a, 42b. As illustrated in FIG. 8, the outermost XML markup tags in the data group 40 are the <DATA-GROUP></DATA-GROUP> markup tags. These <DATA-GROUP></DATA-GROUP> markup tags establish the outermost containment of the group(s) of data to be displayed. As is described below, when a GUI according to the present invention is requested, the <DATA-GROUP></DATA-GROUP> markup tags for a selected data group are matched (i.e., a relationship is established) with the <LAYOUT></LAYOUT> markup tags of a selected display layout.

Hierarchically ordered groups within a data group are identified by <GROUP></GROUP> markup tags. Groups may be independent of each other or may be nested within other groups. Each group within a data group contains specific XML data items in hierarchical order. Each data item is declared using <DATA-TYPE></DATA-TYPE> markup tags as illustrated in FIG. 9. Exemplary data item types, including elementary, compound, and complex data items that may be declared, are listed below in Table 1.

TABLE 1

| Data Item Types | |
| --- | --- |
| String | A string is a collection of characters. |
| Number | A number is any valid numeric expression of the form "characteristic.fraction". |
| Boolean | A boolean data item contains either a true value or a false value. |

TABLE 1-continued

Data Item Types

| | |
|---|---|
| Date | Any valid data expression in a subset of ISO 8601 format (yyyy-mm-dd). |
| Time | Any valid data expression in a subset of ISO 8601 format (hh-mm-ss). |
| TCP-IP Address | A compound data type that stores a TCP-IP formatted numeric address. |
| Network-Name | A compound data type that can be resolved by host name or DNS to a TCP-IP address. |
| Telephone Number | A compound data type that can be used to address a device on PSTN. |
| Rich Text | A compound data type that contains text, text formatting and special embedded tags to do linking. |
| Image | A complex data type that stores a bit stream that is rendered as a visual image. |
| Audio | A complex data type that stores a bit stream that is rendered as a sound. |
| Video | A complex data type that stores a bit stream that is rendered as a video sequence. |
| Bit-Stream | A complex data type that stores a contiguous stream of binary data. |

Mandatory and optional attributes and sub-tags may be utilized to further define and initialize a data item. Data item attributes are listed below in Table 2 and data item sub-tags are listed below in Table 3.

TABLE 2

Data Item Attributes

| | |
|---|---|
| Mandatory | When this attribute is specified with a TRUE value, then the value of the data item must be entered when this data item is displayed in a user query. |
| Enabled | If a data item is enabled, then it is in a state which allows the data item to be re-valued by a user interface action. If the data item is disabled, then the user interface may not change the value of the data item. |
| Shown | Data items may be initially defined as visible (SHOWN = "TRUE") or invisible (SHOWN = "FALSE"). |
| Precision | Specifies the numeric precision of a <NUMBER> data item. |
| Validate-When | Validate data item's value when this event is invoked. |
| Selected | When a data item is selected, it is rendered with selected emphasis. |

TABLE 3

Data Item Sub-Tags

| | |
|---|---|
| <CAPTION> | Specifies a caption for a data item. This sub-tag is a container tag which may contain the following sub-tags to specify the caption information: <STRING>, <IMAGE>, <AUDIO> and <VIDEO>. |
| <STRING> | Specifies a text string to use in captioning a data item. |
| <IMAGE> | Specifies an image to use in captioning a data item. |
| <AUDIO> | Specifies an audio clip to use in captioning a data item. |
| <VIDEO> | Specifies a video clip to use in captioning a data item. |
| <VALUE> | Specifies an initial value for a data item. |
| <TIP> | Provides a more complete description of a data item or additional help information related to a data item. |
| <HINT> | Provides a short phrase description of a data item. |

According to a preferred embodiment of the present invention, conditional information can be used to alter the presentation of data items of a data group. For example, a data group specification becomes interactive with the addition of <WHEN></WHEN> markup tags. The data group illustrated in FIG. 10, when matched with a wizard presentation layout, can produce a two page wizard which prompts a user for a name and address. When this data group is displayed and the user enters "USA" for the country name, a county field will then be dynamically presented to the user.

<WHEN></WHEN> markup tags may be utilized with any data item. If the condition-attribute expression within <WHEN></WHEN> markup tags evaluates to true, then the sub-tags nested within the <WHEN></WHEN> markup tags are available for processing. If the condition is false, the included sub-tags are not available for processing.

Matching Data Groups and Display Layouts

Figure 11A:
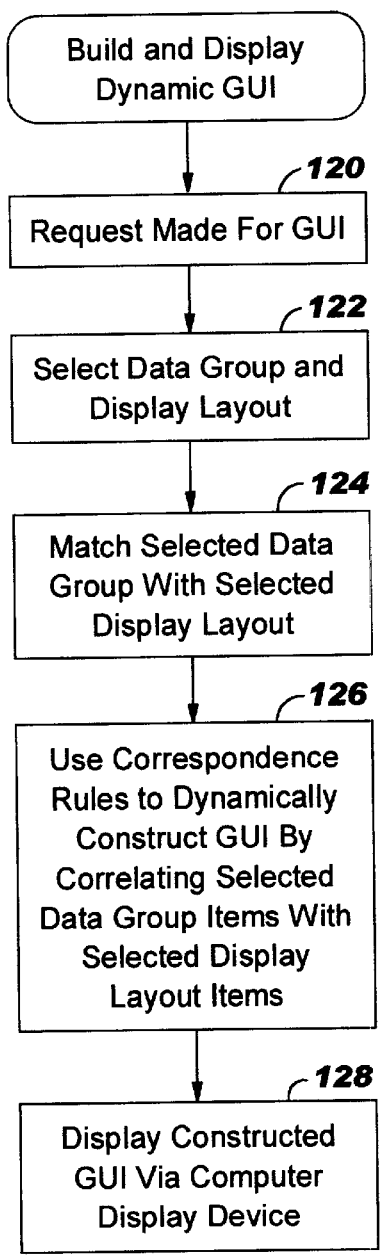
FIG. 11A schematically illustrates operations for building and displaying a dynamic GUI according to the present invention.

Referring now to FIG. 11A, operations for building and displaying a dynamic GUI according to the present invention are illustrated. When a request is made to display a specified GUI (Block 120), a data group and a display layout are selected (Block 122) using specified attributes "DATA-GROUP-ID" and "LAYOUT-ID", respectively, that are contained within the request. As described above, the selected display layout contains one or more areas within which data items from the selected data group are displayed.

At display time, the selected data group is matched with the selected display layout (Block 124) and established correspondence rules are utilized to dynamically construct a GUI by combining the selected data group with the selected display layout (Block 126). The constructed GUI can then be displayed via a computer display device (Block 128).

Preferably, the renderer that displays the constructed GUI within a computer display device creates the proper GUI controls for each area of a display layout. GUI controls may be selected based on the data type of a data item. In addition, GUI controls may be selected from a class of GUI controls or may be referenced by a specific data item. In addition, it is preferable that a renderer is sensitive to the location of a display device and is configured to choose the appropriate language and display format for the displayed GUI based on the location of the display device. Renderers are well known by those of skill in the art and need not be described further herein.

Figure 11B:
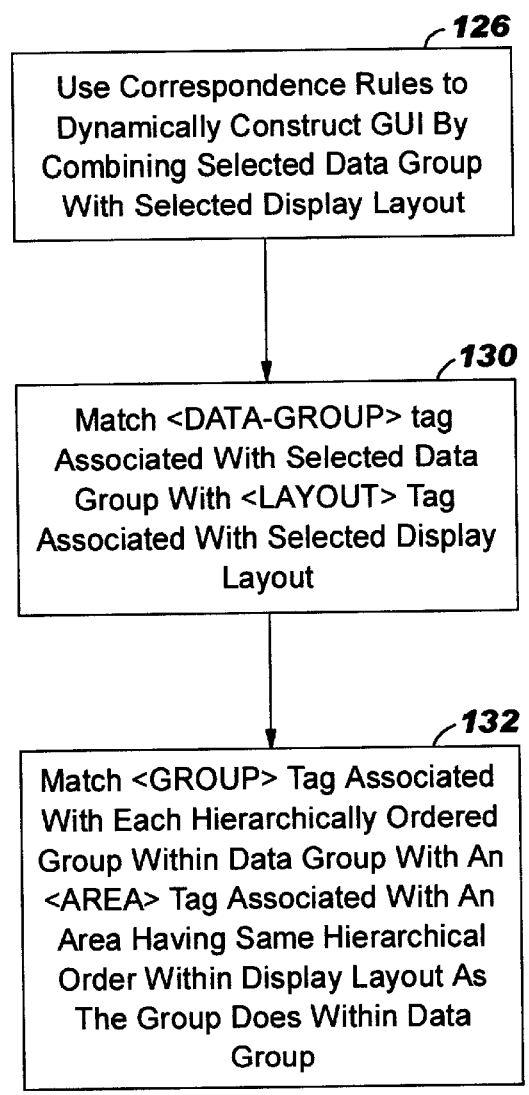
FIG. 11B schematically illustrates operations for utilizing established correspondence rules to dynamically construct a GUI with a selected data group and a selected display layout, according to the present invention.

Referring now to FIG. 11B, the step of utilizing established correspondence rules to dynamically construct a GUI (Block 126) is illustrated in greater detail. A <DATA-GROUP> markup tag associated with a selected data group is matched with the <LAYOUT> markup tag associated with the selected display layout (Block 130). As described above, the data group contains one or more hierarchically ordered groups. The <GROUP> markup tag associated with each hierarchically ordered group within the data group is matched with an <AREA> markup tag that is associated with an area having the same hierarchical order within the display layout as the group does within the data group (Block 132).

If there are more groups specified within a data group than there are areas specified within a display layout, the <GROUP> markup tag for a group is matched with an <AREA> markup tag associated with a default area that is logically inserted into the display layout. <GROUP> tags associated with groups nested within other groups are matched with <AREA> tags associated with areas that are similarly nested within other area definitions.

Figure 12A:
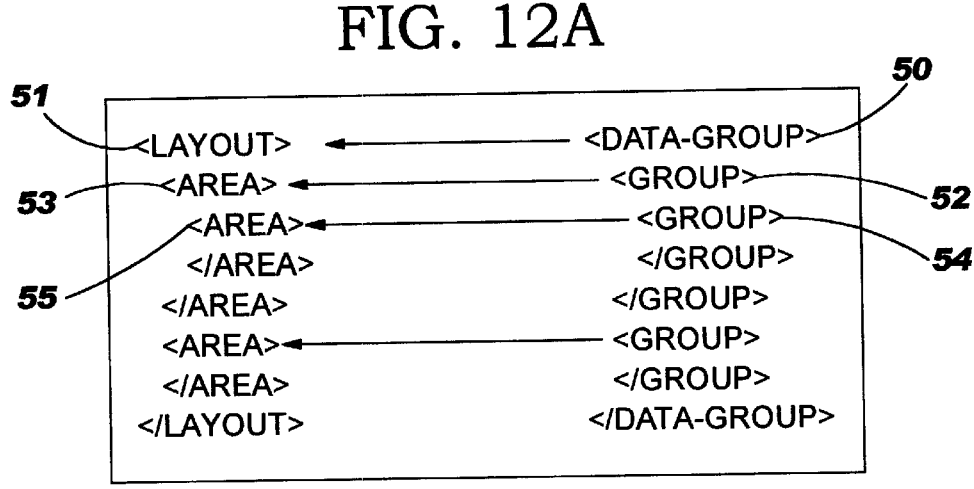
FIG. 12A illustrates the matching of a selected display layout with a selected data group.

FIG. 12A illustrates matching a selected display layout with a selected data group. The <DATA-GROUP> markup tag 50 is matched with the <LAYOUT> markup tag 51. The <GROUP> markup tag 52 is matched with the <AREA> markup tag 53 and the nested <GROUP> markup tag 54 is matched with a correspondingly nested <AREA> markup tag 54.

Figure 12B:
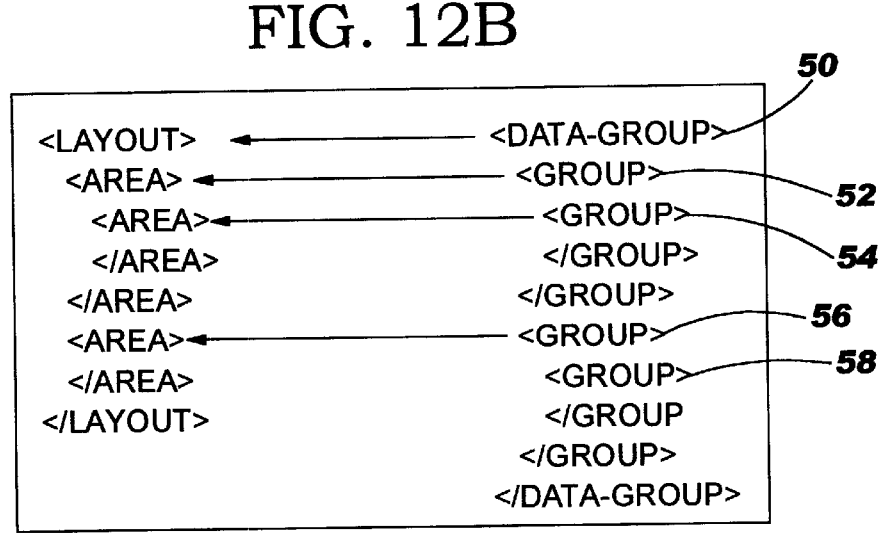
FIG. 12B illustrates a data group containing more groups than there are areas within a display layout with which the data group is matched.
Figure 12C:
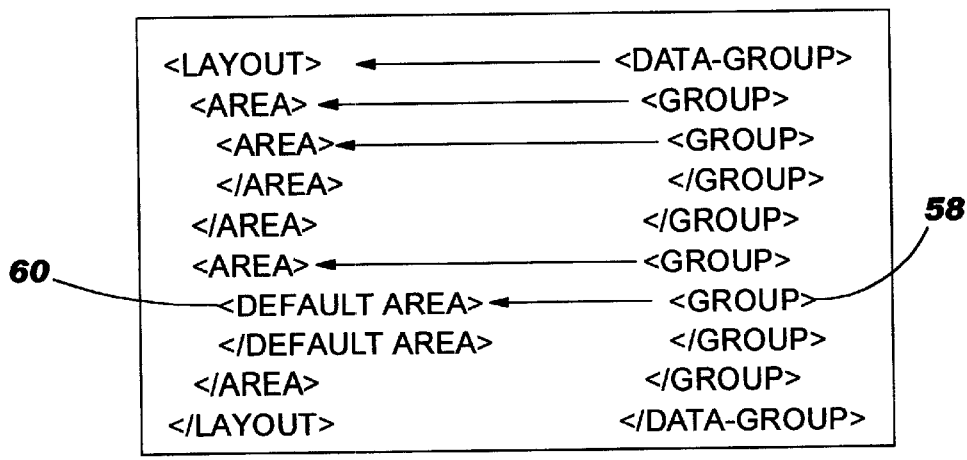
FIG. 12C illustrates a default area logically inserted within the display layout so as to be matched with the additional group within the data group of FIG. 12B.

In FIG. 12B, the illustrated data group contains more groups than there are areas within the display layout. The <GROUP> markup tag 58 does not have a corresponding <AREA> markup tag. As illustrated in FIG. 12C, a default area (indicated by <DEFAULT AREA> markup tag 60 is logically inserted within the display layout so as to be matched with the additional group defined by the that the <GROUP> markup tag 58.

Referring now to FIG. 13A, an XML data group 72 and an XML display layout 74 have XML markup tags that are matched to produce the dynamic GUI 70 illustrated in FIG. 13B. The illustrated data group 72 includes a single group. The <GROUP> markup tag within 5 the data group 72 is matched with the <AREA> markup tag within the display layout 74 as illustrated by arrow 73. Data items hierarchically ordered within the group include data entry fields and respective captions for the following: "Title", "First Name", "Initial", and "Last Name". These data items are displayed in the hierarchical order of the data group within the area defined by the display layout 74, as illustrated in FIG. 13B.

According to another embodiment of the present invention, data items can be displayed in an order different from their hierarchical order within a data group. As illustrated in FIG. 14, an area within a display layout can be modified to change the display order of data items contained within a data group. In FIG. 14, the XML markup tags <COMPONENT ID="LastName"/> and <COMPONENT ID="FirstName"/> are inserted between the <AREA></AREA> markup tags as illustrated. This will cause the data entry fields and respective captions for "FirstName" and "LastName" to be reversed when displayed within the dynamic GUI 70 of FIG. 13A.

Figure 15:
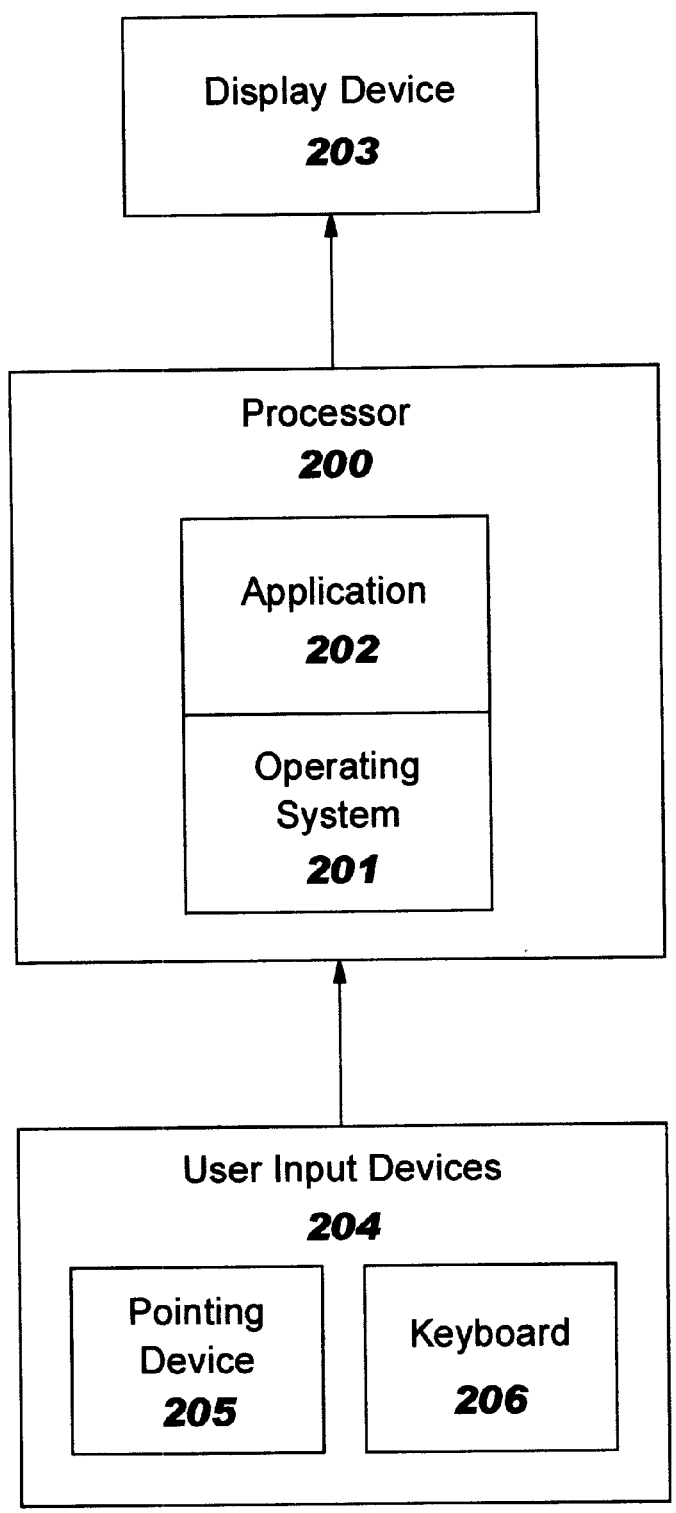
FIG. 15 schematically illustrates a data processing system within which various operations of the present invention may be performed.

FIG. 15 illustrates a data processing system in which the present invention may be utilized. As seen in FIG. 15, a data processor 200 may have an operating system (such as UNIX®, Windows 95®, Windows NT®, and the like) 201 resident therein. An application program 202-may-be running on the operating system 201. The processor 200 displays information on a display device 203. The display device 203 has a plurality of picture elements (collectively referred to as a screen) which may define the appearance of a GUI displayed on the display device 203. The contents of the screen 203 and, therefore, the appearance of the GUI, may be controlled or altered by the application program 202 or the operating system 201, either individually or in combination. For obtaining input from a user, the operating system 201, the application program 202, or both, may utilize user input devices 204. User input devices 204 may include a pointing device 205 and a keyboard 206 or other input devices known to those of skill in the art.

Exemplary data processing systems in which the present invention may be utilized include, but are not limited to, Sun Microsystems®, Apple®, IBM®, and IBM®-compatible personal computers and workstations. However, it is to be understood that various computing devices and processors may be utilized to carry out the present invention without being limited to those enumerated herein. Exemplary operating systems within which the present invention may be utilized include, but are not limited to, UNIX®, Windows 95®, Windows 95®, and Windows NT®.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clause are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A method of displaying a requested graphical user interface (GUI) via a computer display, the method comprising the steps of:

selecting one of a plurality of Extensible Markup Language (XML) data groups, wherein the selected XML data group includes a first aggregation of data, and at least one XML data item hierarchically ordered within the first aggregation of data;

selecting one of a plurality of XML display layouts, wherein the selected XML display layout contains a first area that defines a respective first GUI display space within which XML data items from the first aggregation of data can be displayed;

matching an XML markup tag associated with the first aggregation of data within the selected data group with an XML markup tag associated with the first area within the selected XML display layout; and rendering, via a computer display, the at least one XML data item from the first aggregation of data within the first GUI display space.

2. A method according to claim 1 wherein the at least one XML data item comprises a plurality of hierarchically ordered XML data items and wherein the step of rendering the at least one XML data item comprises rendering each XML data item within the first GUI display space on a computer display.

3. A method according to claim 1 wherein the at least one XML data item comprises a plurality of hierarchically ordered XML data items, wherein the first area contains display order information for the plurality of XML data items, and wherein the step of rendering the at least one XML data item comprises rendering each XML data item within the first GUI display space according to the display order information.

4. A method according to claim 1 wherein the at least one XML data item comprises a plurality of hierarchically ordered XML data items, wherein the first area contains display format information that defines a format within which the plurality of XML data items are displayed, and wherein the step of rendering the at least one XML data item comprises rendering each XML data item within the first GUI display space according to the display format information.

5. A method according to claim 1 further comprising the step of rendering a GUI control within the computer display, wherein the GUI control is associated with an XML data item displayed within the first GUI display space.

6. A method according to claim 5 wherein the step of rendering a GUI control comprises selecting the GUI control based on XML data item type.

7. A method of displaying a requested graphical user interface (GUI) via a computer display, the method comprising the steps of:

selecting one of a plurality of Extensible Markup Language (XML) data groups from a plurality of XML data groups, wherein the selected XML data group includes first and second aggregations of data hierarchically ordered within the selected XML data group, a plurality of XML data items hierarchically ordered within the first aggregation of data, and a plurality of XML data items hierarchically ordered within the second aggregation of data;

selecting one of a plurality of XML display layouts, wherein the selected XML display layout contains first and second areas, wherein the first area defines a respective first GUI display space within which XML data items from the first aggregation of data can be displayed, and wherein the second area defines a respective second GUI display space within which XML data items from the second aggregation of data can be displayed;

matching XML markup tags associated with the first and second aggregations of data within the selected XML data group with respective XML markup tags associated with the first and second areas contained within the selected display layout; and rendering, via a computer display, the plurality of XML data items from the first aggregation of data in hierarchical order within the first GUI display space and the plurality of XML data items from the second aggregation of data in hierarchical order within the second GUI display space.

8. A method according to claim 7 wherein the first area contains display order information for the plurality of XML data items contained within the first aggregation of data, and wherein the step of rendering the plurality of XML data items from the first aggregation of data comprises rendering the plurality of XML data items from the first aggregation of data within the first GUI display space according to the display order information.

9. A method according to claim 7 wherein the second area contains display order information for the plurality of XML data items contained within the second aggregation of data, and wherein the step of rendering the plurality of XML data items from the second aggregation of data comprises rendering the plurality of XML data items from the second aggregation of data within the second GUI display space according to the display order information.

10. A method according to claim 7 wherein the first area contains display format information that defines a format within which the plurality of XML data items from the first aggregation of data are displayed, and wherein the step of rendering the plurality of XML data items from the first aggregation of data within the first GUI display space comprises rendering the plurality of XML data items from the first aggregation of data within the first GUI display space according to the display format information.

11. A method according to claim 7 wherein the second area contains display format information that defines a format within which the plurality of XML data items from the second aggregation of data are displayed, and wherein the step of rendering the plurality of XML data items from the second aggregation of data within the second GUI display space comprises rendering the plurality of XML data items from the second aggregation of data within the second GUI display space according to the display format information.

12. A method according to claim 7 further comprising the step of rendering a GUI control within the computer display, wherein the GUI control is associated with an XML data item displayed within the first GUI display space.

13. A method according to claim 12 wherein the step of rendering a GUI control comprises selecting the GUI control based on XML data item type.

14. A method according to claim 7 further comprising the step of rendering a GUI control within the computer display, wherein the GUI control is associated with an XML data item displayed within the second GUI display space.

15. A method according to claim 7 wherein a third aggregation of data containing at least one XML data item is nested within one of the first and second aggregations of data and wherein a third area that defines a respective third GUI display space is nested within one of the first and second areas, further comprising the steps of:

matching an XML markup tag associated with the third aggregation of data with the third area; and rendering the at least one XML data item from the third aggregation of data within the third GUI display space.

16. A system for displaying a requested graphical user interface (GUI) via a computer display, comprising:

means for selecting one of a plurality of Extensible Markup Language (XML) data groups, wherein the selected XML data group includes a first aggregation of data, and at least one XML data item hierarchically ordered within the first aggregation of data;

means for selecting one of a plurality of XML display layouts, wherein the selected XML display layout contains a first area that defines a respective first GUI display space within which XML data items from the first aggregation of data can be displayed;

means for matching an XML markup tag associated with the first aggregation of data within the selected data group with an XML markup tag associated with the first area within the selected XML display layout; and means for rendering, via a computer display, the at least one XML data item from the first aggregation of data within the first GUI display space.

17. A system according to claim 16 wherein the at least one XML data item comprises a plurality of hierarchically ordered XML data items and wherein the means for rendering the at least one XML data item comprises means for rendering each XML data item within the first GUI display space on a computer display.

18. A system according to claim 16 wherein the at least one XML data item comprises a plurality of hierarchically ordered XML data items, wherein the first area contains display order information for the plurality of XML data items, and wherein the means for rendering the at least one XML data item comprises means for rendering each XML data item within the first GUI display space according to the display order information.

19. A system according to claim 16 wherein the at least one XML data item comprises a plurality of hierarchically ordered XML data items, wherein the first area contains display format information that defines a format within which the plurality of XML data items are displayed, and wherein the means for rendering the at least one XML data item comprises means for rendering each XML data item within the first GUI display space according to the display format information.

20. A system according to claim 16 further comprising means for rendering a GUI control within the computer display, wherein the GUI control is associated with an XML data item displayed within the first GUI display space.

21. A system according to claim 20 wherein the means for rendering a GUI control comprises means for selecting the GUI control based on XML data item type.

22. A system for displaying a requested graphical user interface (GUI) via a computer display, comprising:

means for selecting one of a plurality of Extensible Markup Language (XML) data groups from a plurality of XML data groups, wherein the selected XML data group includes first and second aggregations of data hierarchically ordered within the selected XML data group, a plurality of XML data items hierarchically ordered within the first aggregation of data, and a plurality of XML data items hierarchically ordered within the second aggregation of data; means for selecting one of a plurality of XML display layouts, wherein the selected XML display layout contains first and second areas, wherein the first area defines a respective first GUI display space within which XML data items from the first aggregation of data can be displayed, and wherein the second area defines a respective second GUI display space within which XML data items from the second aggregation of data can be displayed;

means for matching XML markup tags associated with the first and second aggregations of data within the selected XML data group with respective XML markup tags associated with the first and second areas contained within the selected display layout; and means for rendering, via a computer display and without requiring changes and recompiling, the plurality of XML data items from the first aggregation of data in hierarchical order within the first GUI display space and the plurality of XML data items from the second aggregation of data in hierarchical order within the second GUI display space.

23. A system according to claim 22 wherein the first area contains display order information for the plurality of XML data items contained within the first aggregation of data, and wherein the means for rendering the plurality of XML data items from the first aggregation of data comprises means for rendering the plurality of XML data items from the first aggregation of data within the first GUI display space according to the display order information.

24. A system according to claim 22 wherein the second area contains display order information for the plurality of XML data items contained within the second aggregation of data, and wherein the means for rendering the plurality of XML data items from the second aggregation of data comprises means for rendering the plurality of XML data items from the second aggregation of data within the second GUI display space according to the display order information.

25. A system according to claim 22 wherein the first area contains display format information that defines a format within which the plurality of XML data items from the first aggregation of data are displayed, and wherein the means for rendering the plurality of XML data items from the first aggregation of data within the first GUI display space comprises means for rendering the plurality of XML data items from the first aggregation of data within the first GUI display space according to the display format information.

26. A system according to claim 22 wherein the second area contains display format information that defines a format within which the plurality of XML data items from the second aggregation of data are displayed, and wherein the means for rendering the plurality of XML data items from the second aggregation of data within the second GUI display space comprises means for rendering the plurality of XML data items from the second aggregation of data within the second GUI display space according to the display format information.

27. A system according to claim 22 further comprising means for rendering a GUI control within the computer display, wherein the GUI control is associated with an XML data item displayed within the first GUI display space.

28. A system according to claim 27 wherein the means for rendering a GUI control comprises means for selecting the GUI control based on XML data item type.

29. A system according to claim 22 further comprising means for rendering a GUI control within the computer display, wherein the GUI control is associated with an XML data item displayed within the second GUI display space.

30. A system according to claim 22 wherein a third aggregation of data containing at least one XML data item is nested within one of the first and second aggregations of data and wherein a third area that defines a respective third GUI display space is nested within one of the first and second areas, further comprising:

means for matching an XML markup tag associated with the third aggregation of data with the third area; and means for rendering the at least one XML data item from the third aggregation of data within the third GUI display space.

31. A computer program product for displaying a requested graphical user interface (GUI) via a computer display, the computer program product comprising a computer usable storage medium having computer readable program code means embodied in the medium, the computer readable program code means comprising:

computer readable program code means for selecting an Extensible Markup Language (XML) data group, wherein the selected XML data group includes a first aggregation of data, and at least one XML data item hierarchically ordered within the first aggregation of data;

computer readable program code means for selecting one of a plurality of XML display layouts, wherein the selected XML display layout contains a first area that defines a respective first GUI display space within which XML data items from the first aggregation of data can be displayed;

computer readable program code means for matching an XML markup tag associated with the first aggregation of data within the selected data group with an XML markup tag associated with the first area within the selected XML display layout; and computer readable program code means for rendering, via a computer display, the at least one XML data item from the first aggregation of data within the first GUI display space.

32. A computer program product according to claim 31 wherein the at least one XML data item comprises a plurality of hierarchically ordered XML data items and wherein the computer readable program code means for rendering the at least one XML data item comprises computer readable program code means for rendering each XML data item within the first GUI display space on a computer display.

33. A computer program product according to claim 31 wherein the at least one XML data item comprises a plurality of hierarchically ordered XML data items, wherein the first area contains display order information for the plurality of XML data items, and wherein the computer readable program code means for rendering the at least one XML data item comprises computer readable program code means for rendering each XML data item within the first GUI display space according to the display order information.

34. A computer program product according to claim 31 wherein the at least one XML data item comprises a plurality of hierarchically ordered XML data items, wherein the first area contains display format information that defines a format within which the plurality of XML data items are displayed, and wherein the computer readable program code means for rendering the at least one XML data item comprises computer readable program code means for rendering each XML data item within the first GUI display space according to the display format information.

35. A computer program product according to claim 31 further comprising computer readable program code means for rendering a GUI control within the computer display, wherein the GUI control is associated with an XML data item displayed within the first GUI display space.

36. A computer program product according to claim 35 wherein the computer readable program code means for rendering a GUI control comprises computer readable program code means for selecting the GUI control based on XML data item type.

37. A computer program product for displaying a requested graphical user interface (GUI) via a computer display, the computer program product comprising a computer usable storage medium having computer readable program code means embodied in the medium, the computer readable program code means comprising:
   computer readable program code means for selecting one of a plurality of Extensible Markup Language (XML) data groups from a plurality of XML data groups, wherein the selected XML data group includes first and second aggregations of data hierarchically ordered within the selected XML data group, a plurality of XML data items hierarchically ordered within the first aggregation of data, and a plurality of XML data items hierarchically ordered within the second aggregation of data;
   computer readable program code means for selecting one of a plurality of XML display layouts, wherein the selected XML display layout contains first and second areas, wherein the first area defines a respective first GUI display space within which XML data items from the first aggregation of data can be displayed, and wherein the second area defines a respective second GUI display space within which XML data items from the second aggregation of data can be displayed;
   computer readable program code means for matching XML markup tags associated with the first and second aggregations of data within the selected XML data group with respective XML markup tags associated with the first and second areas contained within the selected display layout; and
   computer readable program code means for rendering, via a computer display, the plurality of XML data items from the first aggregation of data in hierarchical order within the first GUI display space and the plurality of XML data items from the second aggregation of data in hierarchical order within the second GUI display space.

38. A computer program product according to claim 37 wherein the first area contains display order information for the plurality of XML data items contained within the first aggregation of data, and wherein the computer readable program code means for rendering the plurality of XML data items from the first aggregation of data comprises computer readable program code means for rendering the plurality of XML data items from the first aggregation of data within the first GUI display space according to the display order information.

39. A computer program product according to claim 37 wherein the second area contains display order information for the plurality of XML data items contained within the second aggregation of data, and wherein the computer readable program code means for rendering the plurality of XML data items from the second aggregation of data comprises computer readable program code means for rendering the plurality of XML data items from the second aggregation of data within the second GUI display space according to the display order information.

40. A computer program product according to claim 37 wherein the first area contains display format information that defines a format within which the plurality of XML data items from the first aggregation of data are displayed, and wherein the computer readable program code means for rendering the plurality of XML data items from the first aggregation of data within the first GUI display space comprises computer readable program code means for rendering the plurality of XML data items from the first aggregation of data within the first GUI display space according to the display format information.

41. A computer program product according to claim 37 wherein the second area contains display format information that defines a format within which the plurality of XML data items from the second aggregation of data are displayed, and wherein the computer readable program code means for rendering the plurality of XML data items from the second aggregation of data within the second GUI display space comprises computer readable program code means for rendering the plurality of XML data items from the second aggregation of data within the second GUI display space according to the display format information.

42. A computer program product according to claim 37 further comprising computer readable program code means for rendering a GUI control within the computer display, wherein the GUI control is associated with an XML data item displayed within the first GUI display space.

43. A computer program product according to claim 42 wherein the computer readable program code means for rendering a GUI control comprises computer readable program code means for selecting the GUI control based on XML data item type.

44. A computer program product according to claim 37 further comprising computer readable program code means for rendering a GUI control within the computer display, wherein the GUI control is associated with an XML data item displayed within the second GUI display space.

45. A computer program product according to claim 37 wherein a third aggregation of data containing at least one XML data item is nested within one of the first and second aggregations of data and wherein a third area that defines a respective third GUI display space is nested within one of the first and second areas, further comprising:
   computer readable program code means for matching an XML markup tag associated with the third aggregation of data with the third area; and
   computer readable program code means for rendering the at least one XML data item from the third aggregation of data within the third GUI display space.

46. A method of displaying a requested graphical user interface (GUI) via a computer display, the method comprising the steps of:
   selecting an Extensible Markup Language (XML) data group from a plurality of XML data groups, wherein the selected XML data group includes first and second aggregations of data hierarchically ordered within the selected XML data group, a plurality of XML data items hierarchically ordered within the first aggregation of data, and a plurality of XML data items hierarchically ordered within the second aggregation of data, and wherein a third aggregation of data containing at least one XML data item is nested within one of the first and second aggregations of data and wherein a third area that defines a respective third GUI display space is nested within one of the first and second areas;

selecting an XML display layout, wherein the selected XML display layout contains first and second areas, wherein the first area defines a respective first GUI display space within which XML data items from the first aggregation of data can be displayed, and wherein the second area defines a respective second GUI display space within which XML data items from the second aggregation of data can be displayed;

matching XML markup tags associated with the first and second aggregations of data within the selected XML data group with respective XML markup tags associated with the first and second areas contained within the selected display layout;

rendering, via a computer display, the plurality of XML data items from the first aggregation of data in hierarchical order within the first GUI display space and the plurality of XML data items from the second aggregation of data in hierarchical order within the second GUI display space;

matching an XML markup tag associated with the third aggregation of data with the third area; and rendering the at least one XML data item from the third aggregation of data within the third GUI display space.

47. A method according to claim 46 wherein the first area contains display order information for the plurality of XML data items contained within the first aggregation of data, and wherein the step of rendering the plurality of XML data items from the first aggregation of data comprises rendering the plurality of XML data items from the first aggregation of data within the first GUI display space according to the display order information.

48. A method according to claim 46 wherein the second area contains display order information for the plurality of XML data items contained within the second aggregation of data, and wherein the step of rendering the plurality of XML data items from the second aggregation of data comprises rendering the plurality of XML data items from the second aggregation of data within the second GUI display space according to the display order information.

49. A method according to claim 46 wherein the first area contains display format information that defines a format within which the plurality of XML data items from the first aggregation of data are displayed, and wherein the step of rendering the plurality of XML data items from the first aggregation of data within the first GUI display space comprises rendering the plurality of XML data items from the first aggregation of data within the first GUI display space according to the display format information.

50. A method according to claim 46 wherein the second area contains display format information that defines a format within which the plurality of XML data items from the second aggregation of data are displayed, and wherein the step of rendering the plurality of XML data items from the second aggregation of data within the second GUI display space comprises rendering the plurality of XML data items from the second aggregation of data within the second GUI display space according to the display format information.

51. A method according to claim 46 further comprising the step of rendering a GUI control within the computer display, wherein the GUI control is associated with an XML data item displayed within the first GUI display space.

52. A method according to claim 51 wherein the step of rendering a GUI control comprises selecting the GUI control based on XML data item type.

53. A method according to claim 46 further comprising the step of rendering a GUI control within the computer display, wherein the GUI control is associated with an XML data item displayed within the second GUI display space.

54. A system for displaying a requested graphical user interface (GUI) via a computer display, comprising:

means for selecting an Extensible Markup Language (XML) data group from a plurality of XML data groups, wherein the selected XML data group includes first and second aggregations of data hierarchically ordered within the selected XML data group, a plurality of XML data items hierarchically ordered within the first aggregation of data, and a plurality of XML data items hierarchically ordered within the second aggregation of data, wherein a third aggregation of data containing at least one XML data item is nested within one of the first and second aggregations of data and wherein a third area that defines a respective third GUI display space is nested within one of the first and second areas;

means for selecting an XML display layout, wherein the selected XML display layout contains first and second areas, wherein the first area defines a respective first GUI display space within which XML data items from the first aggregation of data can be displayed, and wherein the second area defines a respective second GUI display space within which XML data items from the second aggregation of data can be displayed;

means for matching XML markup tags associated with the first and second aggregations of data within the selected XML data group with respective XML markup tags associated with the first and second areas contained within the selected display layout; and means for rendering, via a computer display, the plurality of XML data items from the first aggregation of data in hierarchical order within the first GUI display space and the plurality of XML data items from the second aggregation of data in hierarchical order within the second GUI display space;

means for matching an XML markup tag-associated with the third aggregation of data with the third area; and means for rendering the at least one XML data item from the third aggregation of data within the third GUI display space.

55. A system according to claim 54 wherein the first area contains display order information for the plurality of XML data items contained within the first aggregation of data, and wherein the means for rendering the plurality of XML data items from the first aggregation of data comprises means for rendering the plurality of XML data-items from the first aggregation of data within the first GUI display space according to the display order information.

56. A system according to claim 54 wherein the second area contains display order information for the plurality of XML data items contained within the second aggregation of data, and wherein the means for rendering the plurality of XML data items from the second aggregation of data comprises means for rendering the plurality of XML data items from the second aggregation of data within the second GUI display space according to the display order information.

57. A system according to claim 54 wherein the first area contains display format information that defines a format within which the plurality of XML data items from the first aggregation of data are displayed, and wherein the means for rendering the plurality of XML data items from the first aggregation of data within the first GUI display space comprises means for rendering the plurality of XML data items from the first aggregation of data within the first GUI display space according to the display format information.

58. A system according to claim 54 wherein the second area contains display format information that defines a format within which the plurality of XML data items from the second aggregation of data are displayed, and wherein the means for rendering the plurality of XML data items from the second aggregation of data within the second GUI display space comprises means for rendering the plurality of XML data items from the second aggregation of data within the second GUI display space according to the display format information.

59. A system according to claim 54 further comprising means for rendering a GUI control within the computer display, wherein the GUI control is associated with an XML data item displayed within the first GUI display space.

60. A system according to claim 59 wherein the means for rendering a GUI control comprises means for selecting the GUI control based on XML data item type.

61. A system according to claim 54 further comprising means for rendering a GUI control within the computer display, wherein the GUI control is associated with an XML data item displayed within the second GUI display space.

62. A computer program product for displaying a requested graphical user interface (GUI) via a computer display, the computer program product comprising a computer usable storage medium having computer readable program code means embodied in the medium, the computer readable program code means comprising:

computer readable program code means for selecting an Extensible Markup Language (XML) data group from a plurality of XML data groups, wherein the selected XML data group includes first and second aggregations of data hierarchically ordered within the selected XML data group, a plurality of XML data items hierarchically ordered within the first aggregation of data, and a plurality of XML data items hierarchically ordered within the second aggregation of data, wherein a third aggregation of data containing at least one XML data item is nested within one of the first and second aggregations- of data and wherein a third area that defines a respective third GUI display space is nested within one of the first and second areas;

computer readable program code means for selecting an XML display layout, wherein the selected XML display layout contains first and second areas, wherein the first area defines a respective first GUI display space within which XML data items from the first aggregation of data can be displayed, and wherein the second area defines a respective second GUI display space within which XML data items from the second aggregation of data can be displayed;

computer readable program code means for matching XML markup tags associated with the first and second aggregations of data within the selected XML data group with respective XML markup tags associated with the first and second areas contained within the selected display layout; and computer readable program code means for rendering, via a computer display, the plurality of XML data items from the first aggregation of data in hierarchical order within the first GUI display space and the plurality of XML data items- from the second aggregation of data in hierarchical order within the second GUI display space;

computer readable program code means for matching an XML markup tag associated with the third aggregation of data with the third area; and computer readable program code means for rendering the at least.one XML data item from the third aggregation of data within the third GUI display space.

63. A computer program product according to claim 62 wherein the first area contains display order information for the plurality of XML data items contained within the first aggregation of data, and wherein the computer readable program code means for rendering the plurality of XML data items from the first aggregation of data comprises computer readable program code means for rendering the plurality of XML data items from the first aggregation of data within the first GUI display space according to the display order information.

64. A computer program product according to claim 62 wherein the second area contains display order information for the plurality of XML data items contained within the second aggregation of data, and wherein the computer readable program code means for rendering the plurality of XML data items from the second aggregation of data comprises computer readable program code means for rendering the plurality of XML data items from the second aggregation of data within the second GUI display space according to the display order information.

65. A computer program product according to claim 62 wherein the first area contains display format information that defines a format within which the plurality of XML data items from the first aggregation of data are displayed, and wherein the computer readable program code means for rendering the plurality of XML data items from the first aggregation of data within the first GUI display space comprises computer readable program code means for rendering the plurality of XML data items from the first aggregation of data within the first GUI display space according to the display format information.

66. A computer program- product according to claim 62 wherein the second area contains display format information that defines a format within which the plurality of XML data items from the second aggregation of data are displayed, and wherein the computer readable program code means for rendering the plurality of XML data items from the second aggregation of data within the second GUI display space comprises computer readable program code means for rendering the plurality of XML data items from the second aggregation of data within the second GUI display space according to the display format information.

67. A computer program product according to claim 62 further comprising computer readable program code means for rendering a GUI control within the computer display, wherein the GUI control is associated with an XML data item displayed within the first GUI display space.

68. A computer program product according to claim 67 wherein the computer readable program code means for rendering a GUI control comprises computer readable program code means for selecting the GUI control based on XML data item type.

69. A computer program product according to claim 62 further comprising computer readable program code means for rendering a GUI control within the computer display, wherein the GUI control is associated with an XML data item displayed within the second GUI display space.

* * * * *